June 3, 1941.  H. C. LIMA  2,244,524
AUTOMATIC SELF LOADING AND UNLOADING TRUCK
Filed Nov. 3, 1939  3 Sheets-Sheet 1

INVENTOR
Henry C. Lima
BY
M. H. Davis
ATTORNEY

June 3, 1941. H. C. LIMA 2,244,524
AUTOMATIC SELF LOADING AND UNLOADING TRUCK
Filed Nov. 3, 1939 3 Sheets-Sheet 2

INVENTOR
Henry C. Lima
BY
M. W. Davis
ATTORNEY

June 3, 1941. H. C. LIMA 2,244,524
AUTOMATIC SELF LOADING AND UNLOADING TRUCK
Filed Nov. 3, 1939 3 Sheets-Sheet 3
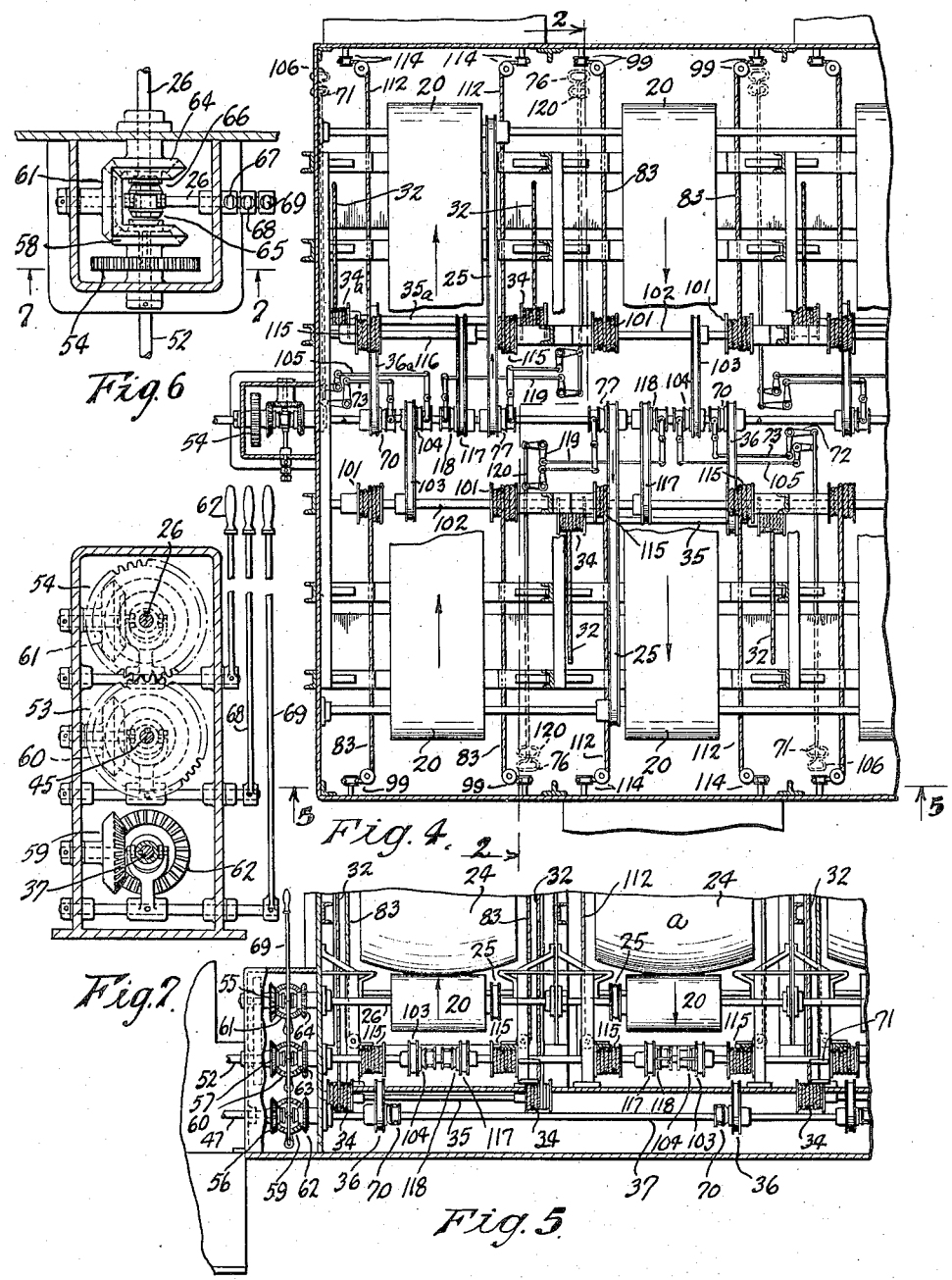

Patented June 3, 1941

2,244,524

UNITED STATES PATENT OFFICE 2,244,524

AUTOMATIC SELF LOADING AND UNLOADING TRUCK

Henry C. Lima, Flushing, N. Y.

Application November 3, 1939, Serial No. 302,644

14 Claims. (Cl. 214—75)

This invention relates to an automatic self-loading truck, and has for an object to provide an improved truck which has means for facilitating handling of substantially cylindrical articles, such for example as beer kegs or barrels, shells for guns and the like, in loading and unloading the truck, particularly to obviate the large amount of lifting required by the operators in loading and unloading such articles in the ordinary type of truck. Thus for example when used as a beer truck it will reduce the danger of injury from handling of the kegs in delivering the full kegs from the truck to a retailer and in reloading the empties on the truck. The same advantages are secured in handling other substantially cylindrical articles.

Other advantages and objects will become apparent from a more detailed description of the invention taken in connection with the accompanying drawings forming a part of this specification. It will, however, be understood that I am not limited to the specific construction and arrangement shown in these drawings but may employ various changes and modifications within the scope of the invention.

In these drawings:

Fig. 4 is a horizontal section through the front portion of the body showing the operating mechanism;

Fig. 5 is a section thereof substantially on the line 5—5 of Fig. 4;

Fig. 6 is a detail section through a gear control box; and

Fig. 7 is a section thereof substantially on line 7—7 of Fig. 6.

Figure 1:
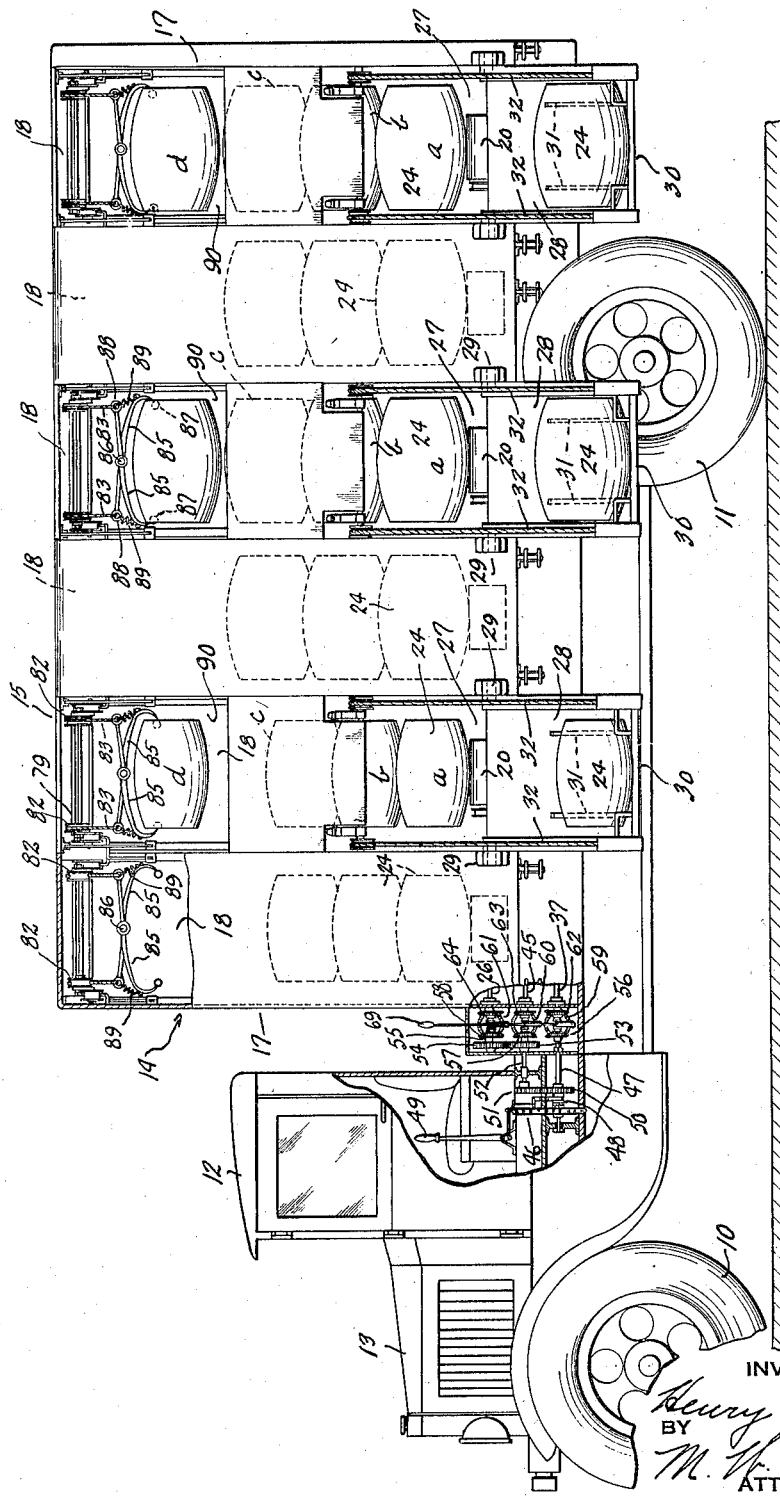
Fig. 1 is a partial side elevation and partial section of a truck embodying my invention.

In the drawings and specification the improved truck is by way of example described as a beer truck, but it will be evident it is not confined to such use but may be employed for handling various other substantially cylindrical articles.

At the present time it is common practice to deliver beer kegs and barrels in an ordinary truck, the filled kegs being dropped one at a time from the rear end of the truck on to a heavy pad and then delivered to the customer, the empties received from the customer being lifted over the sides of the truck to the front thereof or carried over the filled kegs, involving considerable manual shifting of the kegs. All this requires extensive manual handling of both the filled and empty kegs, and as they are quite heavy it is very strenuous work involving danger of frequent injuries, as crushed fingers, etc. It is therefore an object of the present invention to provide improved means for handling these kegs both in loading and unloading by mechanical means operated from the motor of the truck, and so handling the kegs that the required lift of both the filled and empty kegs and other manual handling on the truck is reduced to a minimum, making it much easier for the truckman, increasing amount of deliveries of a truck and reducing damage to the kegs. The same applies to the handling of other substantially cylindrical articles.

The truck comprises the usual front and rear wheels 10 and 11 of any arrangement desired, with the usual driver's cab 12 and the engine (not shown) under the hood 13. The body of the truck 14 is preferably enclosed with heavy sheet metal top walls 15, side walls 16 and end walls 17. The space within this body is divided into a plurality of transversely extending spaces 18, in the present showing there being six of these spaces, although the number may be varied as desired. These spaces may be separated by dividing walls, if desired, but generally this is not necessary it being sufficient to provide a framework 19 between these separate spaces so as to keep the articles from passing from one space to another during transportation. The construction and mechanism of each space is the same so that a description of one is all that is necessary. It is, however, preferred to arrange part of the spaces in reversed relation to the rest so that part of the spaces may be loaded and unloaded from one side of the truck and the others loaded and unloaded from the other side of the truck. In the arrangement illustrated every alternate space is reversed so that the forward space is loaded and unloaded from the right hand side of the truck while the next space is loaded and unloaded from the left hand side of the truck, and so on.

Figure 2:
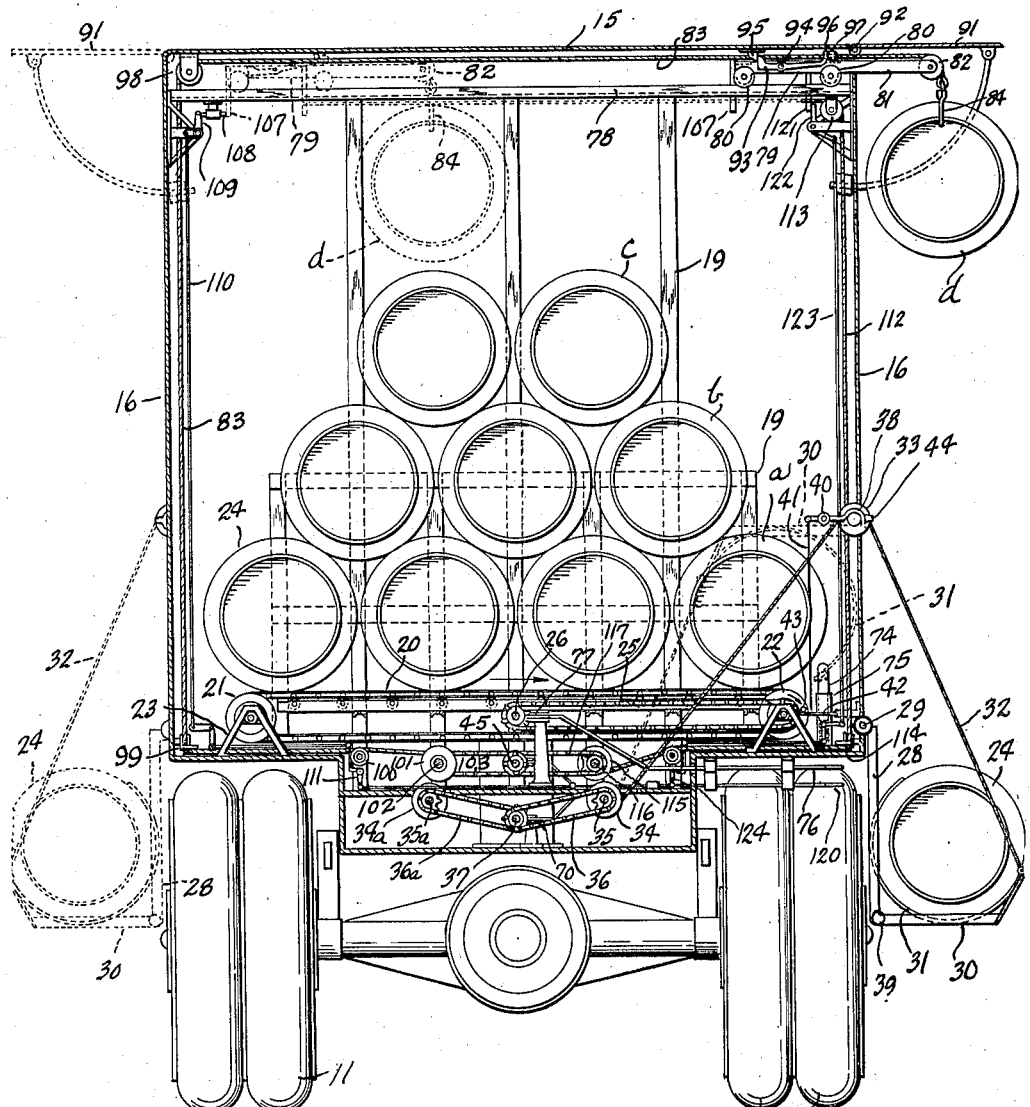
Fig. 2 is a transverse section through one of the article containing spaces, the section being substantially on line 2—2 of Fig. 4.
Figure 3:
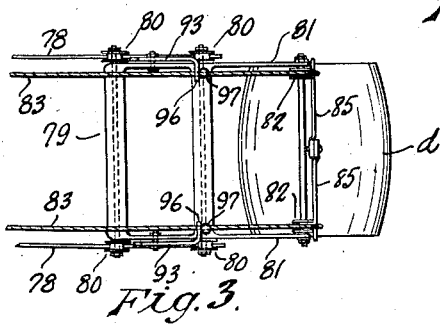
Fig. 3 is a detailed plan view of a lifting and carrying device for the articles.

Each space has a support and conveyor for a plurality of the articles. This in the present construction comprises an endless conveyor 20 at the lower part of the space and extending across the truck body as shown in Figs. 2 and 4. This conveyor runs over supporting drums 21 and 22 at the opposite ends thereof supported on suitable shafts running in suitable bearings on supporting brackets 23. A plurality of kegs indicated at 24 are piled on this conveyor, preferably in substantially pyramidal form as shown, for more easy handling in operation. One of the drums 21 or 22 is driven by a chain drive 25 from a shaft 26 through suitable sprockets to thus operate the conveyor 20. The shaft 26 may be operated from the motor through suitable control mechanism which will presently be described.

Leading from each of the spaces through a side wall of the truck body is a discharge opening 27 at one end of the conveyor 20 and substantially in alignment with the lower row of kegs 24. This opening is normally closed by a closure 28 which also comprises a cradle or means for carrying the individual kegs from the space within the body to a position outside the body where it is easily accessible and may be removed by the attendant and delivered to the customer. In the present arrangement this closure is hinged to the body at the lower part of the opening as indicated at 29, and the cradle is formed by extending the top edge of the closure as indicated at 30 and providing it with spaced curved supports 31 for the keg or barrel. In Fig. 2 this cradle and closure is shown at the right hand of the figure in full lines in the open position with a keg ready to be removed therefrom. In dotted lines at the left of the figure is shown the closure and cradle of a space which is loadable and unloadable from the opposite side of the truck, as for example the next adjacent space to that shown in Fig. 2. Means is provided for mechanically lifting and lowering this closure and cradle from the full line open position to the dotted closed position in the opening 27 and from the opening to the lower position. This includes a pair of cables 32 connected to opposite sides of the cradle at the outer end thereof and running over suitable pulleys 33 mounted in the sides of the body, and these cables run to drums 34 on a shaft 35 located under the body at the lower part thereof and driven by a chain drive 36 through suitable sprockets from a central longitudinal shaft 37 adapted to be driven by a suitable clutch mechanism from the truck engine as will presently be described. The closures and cradles 28 for the spaces opening through the opposite side of the truck are controlled from suitable drums 34a on the shaft 35a driven from the shaft 37 by a similar chain 36a.

When the closure 28 and cradle 30 are drawn up to the closed position they are retained in this position by sutable catches or hooks 38 adapted to seat over projecting pins or lugs 39 carried by the closure. These hooks are pivoted in the body at 40 and are connected by connections 41 to trip levers 42 operated by trip pins 43 on the conveyor drum 22 so as to automatically release the catches 38 upon movement of the conveyor sufficient to deposit a keg in the cradle. These catches may also be released by hand through an extension 44 from the outside of the body.

The various central shafts 26, 37 and 45 are driven from the truck motor through a drive indicated in Figs. 1, 6 and 7. A chain drive 46 from the motor shaft to a countershaft 47 is controlled by a suitable clutch 48 through a hand lever 49 easily accessible to the driver. The shaft 47 carries a spur gear 50 meshing with a gear 51 on a shaft 52. On the shaft 52 is a spur gear 53 meshing with another gear 54 on a short shaft 55. Each of the shafts 47, 52 and 55 also carry beveled gears 56, 57 and 58 respectively meshing with other beveled gears 59, 60 and 61 which in turn mesh with beveled gears 62, 63 and 64 on the shafts 37, 45 and 26 respectively. Each of the two sets of beveled gears for each shaft have clutches 65 and 66 controlled by a single hand lever. Thus as shown in Figs. 6 and 7 clutches 65 and 66 for the upper shaft 26 are controlled by the hand lever 67 to rotate the shaft 26 in either direction desired depending on which clutch is engaged. Similarly the beveled gear drive for the shaft 45 is controlled by the hand lever 68 to drive the shaft 55 in either direction desired, and the clutches for controlling the beveled gears for the shaft 37 are controlled by the hand lever 69 to drive this shaft in either direction, the same type of drive being used for each of the three shafts. These levers 67, 68 and 69 are located in easy access of the driver or any one desired.

When it is desired to deliver a keg to a customer the catches 38 for the closure and cradle 28 and 30 of the proper compartment are released and this cradle carrying a keg is moved from the dotted line closed position of Fig. 2 to the full line open position, its movement being controlled by the cables 32 and the drums 34 from the shaft 37, there being a clutch 70 on the shaft 37 for controlling the drive 36 to the short shaft 35 carrying the drums 34 and which clutch 70 is controlled by a handle 71 accessible to the operator at the side of the truck through a suitable lever 72 and link 73. The pair of drums 34 for each loading and unloading section are mounted on a short shaft 35 at each section, and each one of these shafts is driven from the main shaft 37 by an individual clutch 70 which is operated by a slidable handle 71 located at each section. Thus the closure and cradle at each section or space may be operated independently of the closure at each of the other sections or spaces.

As the cradle moves outwardly it carries with it a keg 24. To prevent other kegs above the first keg moving out the discharge opening pins 74 are provided in front of the opening to retain the next following keg. These pins are mounted to slide in vertical guides 75 with a spring to hold them in elevated position. They are so positioned that when the closure and cradle is moved to closed position these pins are engaged by the curved wall 31 and depressed or pushed downwardly to permit a keg to roll into the cradle in position to be carried outwardly in the cradle on its next outwardly and downwardly swinging movement. When all the kegs in the front inclined row represented by the kegs a, b and c have been delivered the operator by pulling the lever 76 for that particular section can operate the control clutch 77 to advance the conveyor 20 and bring the next row of kegs to position to be delivered from the truck, and so on until the complete contents of a given space have been delivered.

In loading the truck either with filled kegs or empties the kegs can be deposited in the open cradle in its full line position of Fig. 2. Then the keg can be raised from the cradle and carried into the truck body by a lifting and carrying mechanism located in the upper part of each of the separate spaces. Thus in each space is provided a pair of tracks 78 on which runs a carriage 79 on suitable wheels 80. This carriage has an extension 81 carrying a pair of pulleys 82 over which run a pair of cables 83 and carrying at their outer end lifting tongs 84. These tongs may be of different construction, those shown comprising a pair of levers 85 pivoted together at 86 and having curved outer ends 87 to engage under the flanges at the ends of the kegs. The cables 83 are connected to the other ends as by an eye 88, and a spring 89 connects this end of one lever to the other lever adjacent the opposite end thereof. Thus the springs tend to separate the gripping ends 87, but when a keg is on these ends the pull on the cables tends to swing these ends against the end of the keg to hold them and will lift and carry the keg so long as its weight is on the tongs. However, as soon as a keg is deposited on a support so that its weight is no longer on the tongs the springs 89 separate the free ends 87 and release them from their grip on the keg.

In the side wall of the body leading to each of the spaced sections thereof and adjacent the top of this section over the cradle 30 is an opening 90 normally closed by a hinge closure 91 hinged at 92. When the carriage 79 is moved to its outer position the extension 81 projects through this opening as shown in Fig. 2. The carriage is retained in this position by a pair of pivoted pawls or catches 93 pivoted to the carriage at 94 with its free end engaging stops 95 on the top wall of the body. Its opposite free end 96 has a loop or fork embracing the cable 83 for automatic release of these pawls by a ball or stop 97 carried by the cables when the tongs 84 reach their uppermost position. They thus permit the carriage 79 to move inwardly along the tracks 78 and carry with it the keg indicated at $d$ but hold the carriage in the full line position shown while the keg is being lifted to bring it into alignment with the opening 90. The cables 83 pass along under the top wall of the body over suitable guide pulleys 98 at the opposite side thereof and then over guide pulleys 99 and 100 to drums 101 on shaft 102 which is driven from a shaft 45 by a chain drive 103 controlled by suitable clutches 104 operated through suitable link mechanism 105 from a lever or handle 106 in position to be operated by the operator loading the truck. There is one of these controls for each section. As the carriage 79 reaches the opposite side of the truck as shown in dotted lines Fig. 2 a stop or projection 107 thereon engages and shifts a pin 108 which operates the lever 109 and through a linkage 110 and 111 throws out the clutch to stop further movement of the carriage 79 and permit the keg $d$ to move downwardly and be deposited in the space. As above indicated when the weight of the keg is removed from the tongs 84 they are automatically released.

Another cable 112 is connected to the carriage 79 and runs over guide pulleys 113 and 114 to drums 115 on short shafts 116 driven from the shaft 45 by a chain drive 117 controlled by clutch 118 operated through suitable mechanism 119 from a slidable handle and rod 120 accessible to the operator at the side of the body. There is one of these controls for each section, and after the keg has been deposited the operator by manipulating the handle 120 will operate the drums 115 and through the cable 112 draw the carriage 79 back to its full line position of Fig. 2 for another loading operation. As this carriage reaches its outer position a stop 121 thereon engages an arm of the lever 122 and through connecting link 123 and suitable connecting linkage 124 will throw out the clutch 118 and stop further movement of the cable. One of these loading devices and control mechanism therefor is located at each of the sections or spaces within the truck body.

It will thus be seen from the above that the filled kegs or other articles from any individual space or section can be delivered from that space or section independently of each of the other spaces or sections, and as the filled kegs or other articles are placed by suitable power mechanism at a low position easily accessible to the operator all the lifting he has to do is to remove it from the cradle 30 with a very short drop from this cradle. In loading kegs either filled or empty or other articles into this space all the lifting that is required is to place it in the cradle 30 and connect the tongs 84 with it, or if preferred the tongs may be connected to the keg or article while it is on the ground or platform, and deposit it in the proper space within the truck, all the lifting being done by power from the motor of the truck. It will be apparent this greatly facilitates loading and unloading of the truck and reduces the manual lifting and handling which must be done by the operator to a minimum.

While the invention has been described in its use in handling beer kegs it will be understood it is not limited to this particular use, but can be used for handling other substantially cylindrical or barrel-like articles, such for examples as large shells for guns, barrels, cans, and similar articles.

Having thus set forth the nature of my invention, what I claim is:

1. In a beer truck including a motor, a body having a plurality of transversely extending keg containing spaces therein, there being a discharge opening upon each space through a side wall of the body, a cradle for each opening hinged to the body and swingable downwardly and outwardly from the opening to carry a keg to an accessible position outside the body, a conveyor in each space to deliver kegs to the cradle, tracks in the spaces adjacent the tops thereof, a hoist and carrier in each space operable through the side of the body above the cradle, each hoist and carrier comprising a carriage movable across the body on said tracks and tongs to grip the kegs, cables for operating the tongs to lift the kegs, guide pulleys for the cables on the carriage, cables for moving the carriage in opposite directions across the body, operating means from the motor to the cradle, the conveyor and the cables for operating the carriage and tongs, and manually operable means for controlling said operating means.

2. In a beer truck, a motor, a body having a plurality of keg containing spaces extending transversely thereof, the sides of the body having a keg discharge opening from each space, a combined closure and keg carrying cradle for each opening pivoted to the body and swingable downwardly from the opening to a position outside the body to carry a keg to an accessible position, a conveyor in each space to carry kegs to each cradle, a hoist and carrier mounted in the upper part of each space including tracks running transversely of the body, a carriage running on said track and a hoisting means on the carriage to lift kegs from the cradle, a plurality of shafts extending longitudinally of the body, manually controlled clutch drives from the motor to said shafts, and manually controlled clutch drives from the shafts to the cradle, the conveyor, the hoist and the carrier to operate the same at the will of an operator.

3. In a beer truck, a motor, a body having a keg containing spaces extending transversely thereof, a side of the body having a keg discharge opening leading from said space, means whereby kegs may be removed from said space through the opening, said side wall having a second opening above the first opening, a track extending across the body at the upper part of said space, a carriage on said track, a hoist on the carriage to lift kegs to said opening, a plurality of wind-up drums, cables running from some of said drums to the carriage to shift it in opposite directions on the track, cables running from other drums to the hoist, catches holding the carriage in position adjacent the second opening, stops on the hoist cables to release the catches when the hoist is raised to a given position, and manually controlled clutch means for driving the drums from the motor.

4. A truck including a motor, comprising a body having a plurality of containing spaces for substantially cylindrical articles extending transversely of the body, the sides of the body having a discharge opening leading from each space, a cradle positioned in each opening and adapted by movement from the opening to carry an article from the space to a position outside the body and constructed to retain it so that the article is accessible to an operator, means within each space for supporting the articles and depositing them one at a time in the cradle, an operative connection from the motor to said means, and means operated by the motor to shift the cradle between the opening and the position outside the body.

5. A truck comprising a body having a plurality of containing spaces for substantially cylindrical articles extending transversely of the body, each communicating with a discharge opening therefrom through a side wall of the body, a hinged cradle at said opening swingable outwardly away from the body opening and adapted to receive an article from said space and carry it by said swinging movement to an accessible position outside the body and so constructed as to retain it in this position, means for moving the cradle between the opening and the latter positions, and means within the space to deposit articles in said cradle.

6. A truck comprising a body having a plurality of containing spaces for substantially cylindrical articles extending transversely of the body, each communicating with a discharge opening therefrom through a side wall of the body at the lower part of the space, a cradle at said opening movable to a position outside the body and by said movement to carry an article from the space to an easily accessible position outside the body, said cradle being so constructed as to retain the article in this position, means for shifting the cradle between the opening and the outside positions, means in the space to deposit said articles in the cradle, said side wall having another opening above said first opening, and a lifting and carrying means adapted to lift articles from the cradle and carry them through the second opening to deposit them in the space in the body.

7. A truck including a motor, comprising a body having a plurality of containing spaces for substantially cylindrical articles extending transversely of the body, the sides of the body having a discharge opening leading from each space, a cradle positioned in each opening and adapted to move from the opening and by said movement to carry an article from the space to a position outside the body so that the article is accessible to an operator, a movable conveyor in each space to carry the articles to the cradle, mechanical means for raising and lowering the cradle, a main drive shaft extending along the body, a drive connection from the motor to the shaft, and manually controlled clutch drive connections from said shaft to the conveyor and to the cradle operating means.

8. In a truck, a body having a space for a plurality of substantially cylindrical articles, a wall of the body having an opening for passage of articles therefrom, a closure for said opening including a cradle for carrying an article and swingable about a lower hinge connection between a position closing the opening and a position outside the body where an article in the cradle is accessible to an operator, said cradle by said movement carrying an article from the body to said accessible position and being so constructed as to retain it in this position, and means in the body for delivering the articles to the cradle.

9. In a truck having a motor, a body having a space for a plurality of substantially cylindrical articles, a wall of the body having an opening for passage of said articles therefrom, a cradle positioned in said opening for carrying an article and swingable about a lower hinge connection between a position at the opening and a position outside the body where an article in the cradle is accessible to an operator, said cradle by said movement carrying an article from the body to said accessible position, means operable from the motor for raising and lowering the cradle, a conveyor in the body for supporting the articles and delivering them to the cradle, and means operated from the motor for operating the conveyor.

10. In a truck having a motor, a body having a space for a plurality of substantially cylindrical articles, a wall of the body having an opening for passage of said articles therefrom, a cradle positioned in said opening for carrying an article and swingable about a lower hinge connection between a position at the opening and a position outside the body where an article in the cradle is accessible to an operator, said cradle by said movement carrying an article from the body to said accessible position, a clutch controlled means operable from the motor for raising and lowering the cradle, a conveyor in the body for supporting the articles and delivering them to the cradle, a clutch controlled means operated from the motor for operating the conveyor, and manually operable means adjacent the cradle for controlling said clutch means.

11. In a truck, a body having a plurality of containing spaces for substantially cylindrical articles extending transversely across the body, the sides of the body having an outlet opening for said articles from each space with the openings from a part of said spaces in one side of the body and the openings from the other spaces in the opposite side of the body, a cradle for each opening hinged at the lower part thereof to swing downwardly and outwardly from the opening and by said movement to carry an article to a lower accessible position outside of the body, power means on the truck for operating the cradle between a position in the opening and the position outside the body, and power means in the different spaces for delivering articles therein to the respective cradles.

12. In a truck including a motor, a body having a containing space for substantially cylindrical articles therein, there being a discharge opening from said space through a wall of the body, a cradle for the opening hinged to the body and swingable downwardly and outwardly from the opening to carry an article to an accessible position outside the body, a conveyor in the space to deliver the articles to the cradle, tracks in the space adjacent the top thereof, a hoist and carrier in the space and operable through a wall of the body above the cradle, the hoist and carrier comprising a carriage movable in the body on said tracks and means to carry the articles, cables for operating the carrying means to lift the articles, guide pulleys for the cables on the carriage, cables for moving the carriage in opposite direction in the body, operating means from the motor to the cradle, the conveyor and the cables for operating the carriage and carrying means, and manually operable means for controlling said operating means.

13. In a truck, a motor, a body having a containing space for substantially cylindrical articles, a wall of the body having a discharge opening for said articles from said space, a combined closure and article carrying cradle for the opening pivoted to the body and swingable downwardly from the opening to a position outside the body to carry an article to an accessible position, a conveyor in the space to carry the articles to the cradle, a hoist and carrier mounted in the upper part of the space including a track, a carriage running on said track and a hoisting means on said carriage to lift articles from the cradle, a shaft, a manually controlled clutch drive from the motor to said shaft, and manually controlled clutch drives from the shaft to the cradle, the conveyor, the hoist and the carrier to operate the same at the will of an operator.

14. In a truck, a motor, a body having a containing space for substantially cylindrical articles, a wall of the body having an article discharge opening leading from said space, means whereby the articles may be removed from said space through the opening, said wall having a second opening above the first opening, a track at the upper part of said space, a carriage on said track, a hoist on the carriage to lift articles to said opening, a plurality of wind-up drums, cables running from some of said drums to the carriage to shift it in opposite directions on the track, cables running from other drums to the hoist, catches holding the carriage in position adjacent the second opening, stops on the hoist cables to release the catches when the hoist is raised to a given position, and manually controlled clutch means for driving the drums from the motor.

HENRY C. LIMA.